United States Patent [19]

Carswell

[11] Patent Number: 5,580,505
[45] Date of Patent: Dec. 3, 1996

[54] PROCESS AND APPARATUS FOR FORMING PERFORATED CERAMIC FIBER PLATES

[75] Inventor: Martin G. Carswell, San Jose, Calif.

[73] Assignee: Alzeta Corporation, Santa Clara, Calif.

[21] Appl. No.: 467,227

[22] Filed: Jun. 6, 1995

[51] Int. Cl.$^6$ .................... B27N 3/12; B28B 1/26
[52] U.S. Cl. .................... 264/87; 249/141; 425/80.1
[58] Field of Search .................... 249/82, 141; 264/86, 264/87, 154, 155, 156; 425/80.1, 84, 85, DIG. 119; 431/328

[56] References Cited

U.S. PATENT DOCUMENTS

| | | | |
|---|---|---|---|
| 3,263,957 | 8/1966 | Lirones | 264/86 |
| 3,683,058 | 8/1972 | Partiot | 264/156 |
| 3,885,907 | 5/1975 | Teague, Jr. | 431/328 |
| 3,954,387 | 5/1976 | Cooper | 431/328 |
| 4,504,218 | 3/1985 | Mihara et al. | 431/328 |
| 4,673,349 | 6/1987 | Abe et al. | 431/328 |
| 4,702,870 | 10/1987 | Setterholm et al. | 425/DIG. 119 |
| 4,874,308 | 10/1989 | Atlas et al. | 249/141 |
| 5,020,983 | 6/1991 | Ito et al. | 249/141 |
| 5,198,236 | 3/1993 | Gunderson et al. | 425/80.1 |
| 5,326,631 | 7/1994 | Carswell et al. | 428/256 |
| 5,494,003 | 2/1996 | Bartz et al. | 122/17 |

Primary Examiner—W. L. Walker
Assistant Examiner—Kenneth M. Jones
Attorney, Agent, or Firm—Paul W. Garbo

[57] ABSTRACT

Unusually strong and highly perforated plates are formed by pressurized filtration of a suspension of chopped ceramic fibers in an aqueous dispersion of colloidal alumina or colloidal silica through a mold having a perforated filter base and a pin support base having pins that extend through and beyond the perforations of the filter base. Pressurized filtration is preferably conducted by applying vacuum on the downstream side of the mold. When the layer of chopped fibers deposited on the perforated filter base has the desired thickness, filtration is stopped. The perforated filter base and pin support base are moved apart to retract the pins from contact with the perforated layer of chopped fibers which is transferred to a drier for conversion into a strong perforated plate.

13 Claims, 2 Drawing Sheets

PROCESS AND APPARATUS FOR FORMING PERFORATED CERAMIC FIBER PLATES

BACKGROUND OF THE INVENTION

This invention relates to a process of forming perforated ceramic fiber plates and to apparatus for carrying out the production of such plates. More particularly, the invention is directed to the production of perforated ceramic fiber plates wherein the perforations are of small diameter and are closely spaced from one another.

Perforated ceramic plates of various configurations and compositions have been disclosed in numerous patents. U.S. Pat. Nos. 3,954,387 to Cooper, 4,504,218 to Mihara et al and 4,673,349 to Abe et al are illustrative of the varieties of compositions and configurations of perforated ceramic plates that have been proposed. An important use of perforated ceramic plates is as burner faces of gas burners.

Domestic water heaters commonly have vertical cylindrical water tanks with diameters of at least 12 inches, most frequently in the range of about 14 to 18 inches, and metal gas burners positioned below the bottoms of the water tanks. Such water heaters represent a large potential market for perforated ceramic plates if made capable of serving as gas burner plates in lieu of conventional metal gas burners. The advantage of perforated ceramic plates for water heaters is maximized if they can function as flameless infrared burners emitting radiant energy directly to the bottoms of the upright water tanks. For practical burner use, the thickness of perforated ceramic plates should be not more than about 0.5 inch.

There are many difficult requirements imposed on perforated ceramic plates if they are to function as infrared burners under the water tanks of domestic water heaters. The metal gas burners conventionally used with water heaters have been designed for blue flame combustion at a firing rate of at least 40,000 BTU (British Thermal Units) per hour. For a perforated ceramic plate to replace the metal burner, it must be operable at a firing rate of at least 40,000 BTU per hour, preferably about 50,000 BTU per hour. Such operation makes it necessary that the perforations are not more than 0.8 inch in diameter to prevent flash back, and are so closely spaced that the perforated area is at least 25% of the burner plate area to minimize pressure drop for naturally inspirated operation with low-pressure (e.g., 4 inches water column) natural gas.

Consequently, these parameters require a burner plate with at least one square foot of its face containing the aforesaid closely spaced small perforations to permit a firing rate of at least 40,000 BTU per hour. The ceramic burner plate must also have sufficient strength to enable an unsupported plate span of at least 12 inches to resist sagging and fracturing during extended use as an infrared burner. The inclusion of ceramic fibers in such a burner plate is indispensable for strength.

A search of the technical literature reveals that the production of large, closely perforated ceramic fiber plates from an aqueous suspension of the chopped fibers has previously not even been attempted, probably because of the multiple difficult requirements such plates must meet to serve as infrared burner plates.

The aforesaid patents of Mihara et al and Abe et al mention perforated plates with dimensions ranging from approximately 3 inches by 4 inches to less than 8 inches by 8 inches. Worse yet, correspondence with the companies that own these patents has revealed that the patented products are not available because they are not being manufactured. The burner plates of the patent to Cooper are available from the patent owner but the technical data supplied by the owner shows that the largest plate offered is approximately 7.7 inches by 5.5 inches. In summary, the largest perforated ceramic fiber plate mentioned in the aforesaid patents is nearly 62 square inches but the only commercially available perforated plate is offered in the form of rectangles in sizes ranging from 9.5 square inches to 42.2 square inches.

Accordingly, a principal object of the invention is to provide a simple and rapid process of producing highly perforated ceramic fiber plates.

Another important object is to provide a commercially attractive process for vacuum-forming large, highly perforated ceramic fiber plates.

Still a further object is to enhance the economic attractiveness of such a process by eliminating the usual sintering of ceramic products.

An additional important object is to provide apparatus for the vacuum-forming of highly perforated ceramic fiber plates.

These and other features and advantages of the invention will be apparent from the description which follows.

SUMMARY OF THE INVENTION

In accordance with this invention, a highly perforated ceramic fiber plate is produced by vacuum-drawing a uniform suspension of chopped ceramic fibers in an aqueous acidic dispersion of colloidal alumina or colloidal silica through a perforated filter base having pins projecting through and beyond the perforations of the filter base which may be porous and/or have a second group of tiny perforations without pins for the flow of liquid therethrough aided by the applied vacuum.

The pins are set in a flat bed in an arrangement identical to that of the perforations in the filter base which is the arrangement of perforations desired in the ceramic fiber plate to be vacuum-formed thereon; perforations preferably have a diameter in the range of about 0.05 to 0.08 inch. For example, highly perforated ceramic fiber plates with perforations 0.075 inch in diameter and spaced 0.13 inch (center to center) from one another will have about 10,000 perforations per square foot of plate or about 30% perforation area. The pins do not have a tight fit in the perforations of the filter base so that liquid inevitably leaks around the pins and thus aids filtration. Moreover, repeated reciprocation of the pins through the perforations in the filter base leads to wear that beneficially increases liquid flow around the pins. As soon as the filtered fibers form a compact layer or pad of the desired thickness, vacuum-drawing of the aqueous suspension of chopped fibers is terminated by stopping the supply thereof to the perforated filter base.

Vacuum is desirably maintained on the filter base with the fiber layer deposited thereon for a short period, usually less than a minute, after the supply of the aqueous suspension of chopped ceramic fibers has been cut off, to draw air through the compact fiber pad and thus displace excess liquid therefrom. The application of vacuum is then stopped and the pins are fully withdrawn from the fiber pad by pulling the base with the pins and the perforated filter base away from each other. It is a surprising and important property of the specific formulation of chopped ceramic fiber suspension used to vacuum-form the compact perforated fiber layer that the pins can be withdrawn from the wet fiber layer and leave well formed perforations.

The cohesiveness of the wet perforated layer of chopped ceramic fibers is such that the wet fiber layer can be transferred from the perforated filter base to a tray for placement in a drying oven without damage or distortion of the wet perforated fiber layer.

A significant economic advantage of the formulation that was developed to produce highly perforated ceramic fiber plates (perforations not more that 0.08 inch in diameter, closely spaced not more than 0.15 inch from center to center) makes it possible to dry the wet perforated fiber layer at a temperature of only about 450° F. into a strong stiff plate that is capable of spanning more than one foot without sagging even when functioning as an infrared radiant burner. By contrast, ceramic plates, perforated or not, have heretofore involved sintering at temperatures of about 1000° F. and higher. Such high temperature treatment is not only expensive but also is attended by problems of shrinkage and warping of the ceramic plates.

While the perforated ceramic fiber plate simply dried at a temperature of about 450° F. in less than an hour, usually 45 minutes, is serviceable as an infrared burner, it contains water-sensitive matter if colloidal alumina was used in the formulation. In such case, to protect the perforated plate against damage from contact with water, drying of the moist filter layer may be conducted at a higher temperature of about 650° F. to eliminate the water of hydration, i.e., colloidal alumina monohydrate (AlOOH) is converted into insoluble alumina ($Al_2O_3$) thus:

$$2 AlOOH \rightarrow Al_2O_3 + H_2O$$

However, it is preferable to avoid even the modest high temperature required for dehydration, by impregnating the dried plate with a basic solution of colloidal silica and returning the coated plate to the drying oven operating at a temperature of about 450° F. to dry the plate. The colloidal silica may be applied by dipping, brushing or spraying the basic solution. When the plate has dried, the perforated ceramic fiber plate is fully protected against damage from contact with water.

If an aqueous acidic dispersion of colloidal silica is used as the binding agent in lieu of colloidal alumina, drying the wet perforated fiber layer at a temperature of about 450° F. yields a strong stiff plate that requires no further treatment inasmuch as it is, unlike colloidal alumina, not susceptible to water damage.

BRIEF DESCRIPTION OF THE DRAWINGS

To facilitate the further description and understanding of the invention, reference will be made to the accompanying drawings, of which.

DESCRIPTION OF A PREFERRED EMBODIMENT

Figure 1:
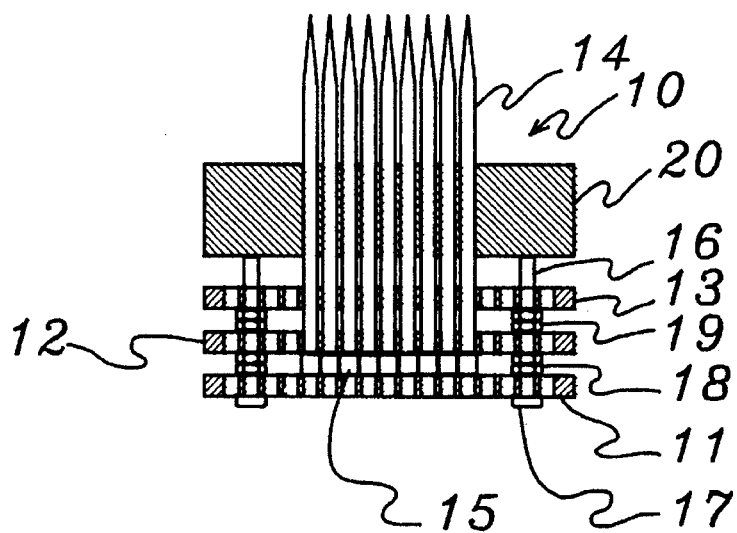
FIG. 1 is a sectional elevation of the mold used for the vacuum-forming of the closely spaced perforated ceramic fiber plate of the invention.

FIG. 1 is a sectional elevation of the vacuum-forming mold used to produce the closely spaced perforated ceramic fiber plate of the invention. Mold 10 has three circular disks 11,12,13 which have perforations, spaced 0.1295 inch center-to-center, corresponding to 69 perforations per square inch of disk. The diameter of the perforations of disks 11,12 is 0.078 inch and that of disk 13 is 0.089 inch. Pins 14 (0.078 inch diameter) pass up through the perforations of disk 12 and their heads 15 are held against disk 12 by disk 11. Several screw posts 16 (only two shown in FIG. 1) pass up through disks 11,12,13. Disk 11 is clamped between screw heads 17 of posts 16 and nuts 18, while disk 12 is clamped between nuts 18 and nuts 19. Thus, pins 14, disks 11,12 and posts 16 are locked together by nuts 18, 19. Disk 13 slips over pins 14 and posts 16 and rests on nuts 19.

Perforated filter base or casting base disk 20 is porous having been formed by sintering polymethylmethacrylate beads. Base disk 20 has perforations (0.089 inch diameter) like those of disk 13 so that both disks 13, 20 can be easily slipped up and down on pins 14. It is to be noted that filter or casting base disk 20 is not perforated to slip over posts 16; in other words, disk 20 rests on the ends of posts 16. While this is the original configuration of the apparatus of the invention, subsequent tests indicated that disk 13 is not necessary as will be explained hereinafter.

Figure 2:
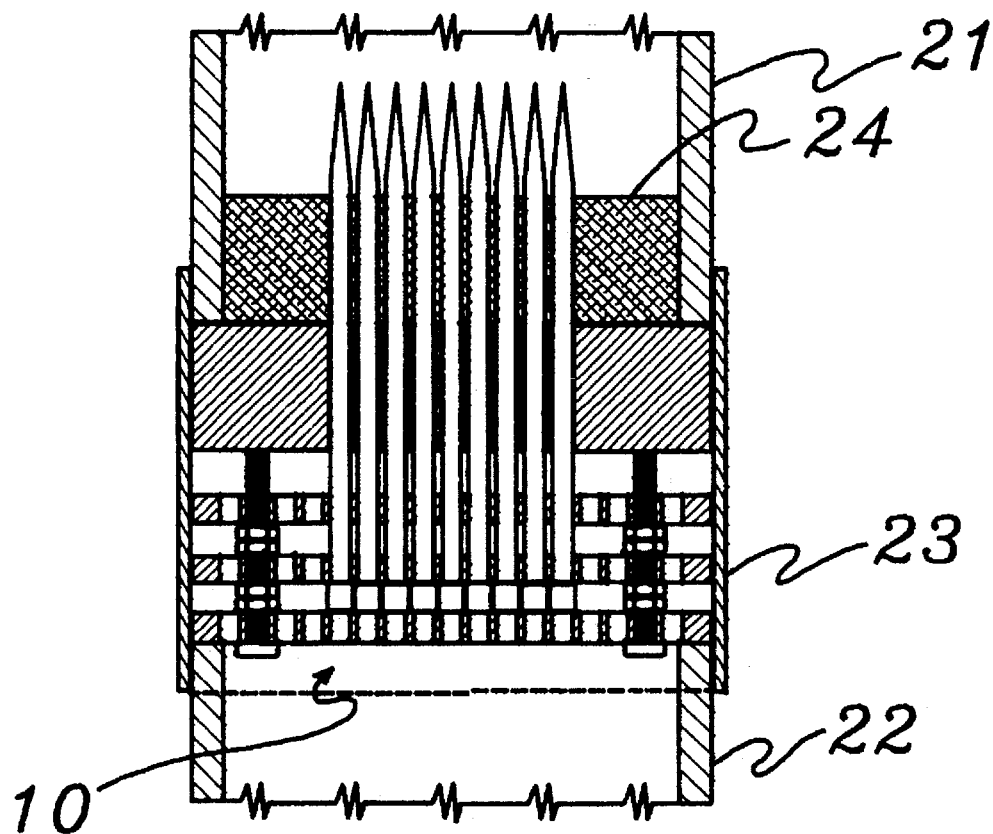
FIG. 2 is a sectional elevation of the mold of FIG. 1 combined with tubes for supplying the liquid suspension of chopped ceramic fibers to the mold and for vacuum-drawing liquid down through the mold to deposit a compact layer or pad of chopped fibers on the filter or casting face of the mold.

FIG. 2 is a sectional elevation of vacuum-forming mold 10 between upper tube 21 into which the suspension of chopped ceramic fibers is poured and lower tube 22 through which liquid passing through mold 10 drains. A tight sleeve 23 provides a seal not only around mold 10 but also between mold 10 and tubes 21,22 at its opposite ends. A vacuum pump (not shown) is connected to tube 22 to draw liquid rapidly through the pores of casting base disk 20 as well as through the annular clearances between pins 14 (0.078 inch diameter) and the perforations (0.089 inch diameter) of disk 20. The resulting filtration of the chopped fiber suspension leaves a compact layer or pad 24 of chopped ceramic fibers around pins 14. When layer 24 of chopped ceramic fibers reaches the desired thickness, say 0.5 inch, the supply of the colloidal alumina and chopped fiber suspension to tube 21 is stopped.

Sleeve 23 is removed to disconnect mold 10 from tubes 21,22. While locked disks 11,12 are held stationary, disk 13 is pushed up against base disk 20 and both disks 13, 20 are pushed up until the top face of disk 20 is aligned with the tips of pins 14. Thus, pins 14 have been completely removed from contact with the vacuum-formed perforated chopped ceramic fiber pad 24 resting on base disk 20. It is an important feature of the invention that this perforated pad 24 of chopped ceramic fibers can be transferred from base disk 20 to a tray without any distortion or damage. As previously mentioned, the perforated ceramic fiber pad on the tray is placed in a drying oven to convert the wet deformable fiber pad into a dry rigid perforated plate.

To vacuum-form another perforated chopped ceramic fiber pad, disks 13, 20 are simply pulled down on pins 14 until disk 13 rests on nuts 19 and disk 20 rests on posts 16. Sleeve 23 is again used to surround mold 10 and connect it to tubes 21,22. The apparatus is thus ready for the reintroduction of the aqueous colloidal alumina suspension of chopped ceramic fibers into tube 21 and the vacuum-drawing thereof through mold 10 into tube 22 to form a compact pad 24 of chopped fibers on base disk 20 around pins 14.

Figure 3:
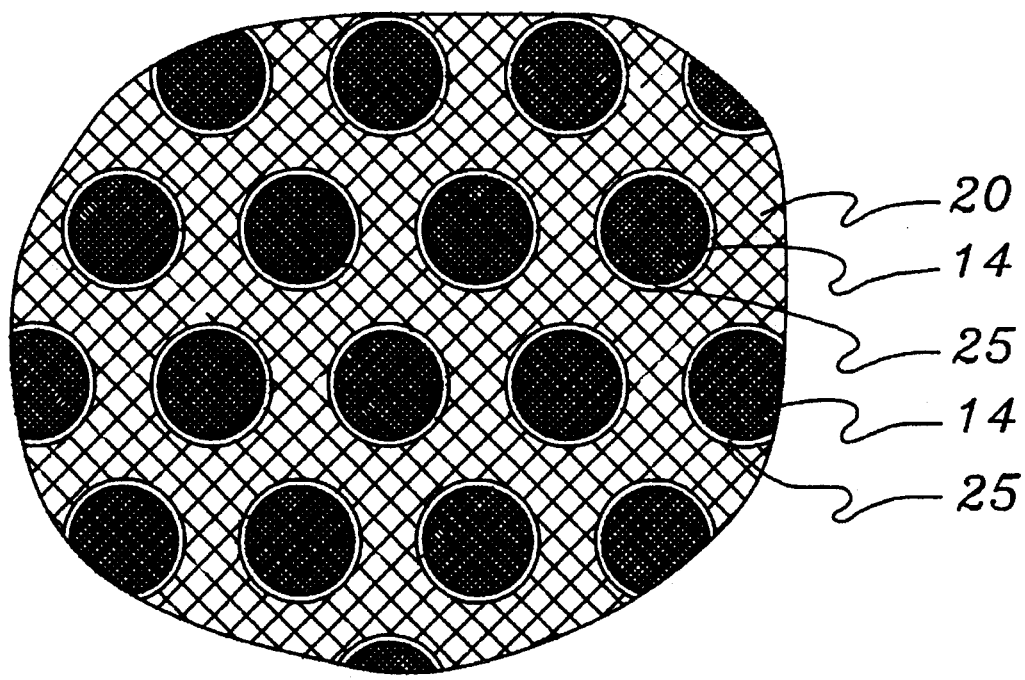
FIG. 3 is a magnified representation (drawn to scale) of a small portion of the casting face of the mold.

FIG. 3 is a magnified scale diagram of a very small portion (about 0.2 square inch) of the casting face of base disk 20 showing the spacing of several complete perforations with pins 14 positioned therein. The perforations and pins 14 are drawn to an enlarged scale to show the narrow annular clearance 25 between each pin 14 and disk 20. Inasmuch as the diameter of the perforations is 0.089 inch and that of pins 14 is 0.078 inch, the width of annular clearance 25 is 0.0055 inch. Clearances 25, representing about 10% of the casting face area, greatly facilitate the flow of the liquid from the chopped fiber suspension down therethrough and leave a compact layer of chopped fibers around pins 14 on disk 20.

The peripheral portion of porous disk 20 which is not perforated permits the drainage of liquid therethrough and the deposition of compact chopped fibers so that the perforated pad of chopped fibers vacuum-formed on disk 20 has a narrow peripheral rim that is not perforated. The rim portion of the perforated ceramic fiber plate produced by the invention requires no perforations because this narrow rim portion is covered by clamping means when the perforated plate is installed as the face of an infrared gas burner.

Originally, disk 13 was made a part of mold 10 as a precaution to help push porous disk 20 upward when a fiber pad had been formed thereon. It had been thought that porous disk 20 might be too weak to permit being pushed up on pins 14 by itself. However, as tests continued it became evident that disk 20 could be easily pushed up on pins 14 without the support of disk 13. In fact, it was further realized that the drainage of liquid around each pin was sufficient to form the compact pad of chopped fibers around pins 14 on a base disk 20 that was not porous. Hence, disk 13 is clearly unnecessary and disk 20 can be formed of an impervious rigid sheet, the rim portion of which must be provided with tiny perforations for the drainage of liquid and the deposition thereon of compact chopped fibers as the un-perforated rim portion of the perforated fiber pad.

It will be observed in FIGS. 1 and 2 that the liquid which filters through porous base disk 20 as well as through the annular clearances between pins 14 and disk 20 can drain freely from mold 20 through the perforations in disks 11,12,13 that are not filled by pins 14. The description of mold 10 has made it clear that mold 10 has only two simple, basic components: a base holding a myriad of closely spaced pins and a perforated filter or casting base that can be moved up and down the pins. The simplicity of the apparatus and its effectiveness in producing strong, compact pads of chopped ceramic fibers is truly surprising when one looks at FIG. 3 and tries to visualize 74 pins 14 per square inch of casting base 20.

While the invention has been described with reference to the production of circular perforated ceramic fiber plates, it is easily adapted to the production of perforated plates of other shapes, such as rectangular, hexagonal and oval, by making the shape of the mold the same as that of the desired perforated plate to be vacuum-formed thereon. Also, while mold 10 is shown in FIG. 2 with tube 21 for supplying the aqueous suspension of chopped ceramic fibers to casting base 20, the same apparatus may be inverted and at least tube 21 immersed in the suspension so that the vacuum applied to tube 22 will draw the suspension against base 20 to deposit chopped ceramic fibers thereagainst as liquid filters up through mold 10 into tube 22. When the perforated fiber pad on base 20 has the desired thickness, the apparatus is lifted so that tube 21 is no longer immersed in the suspension of chopped fibers.

In a specific example of the invention, the suspension of chopped ceramic fibers is prepared by mixing 52 grams of glacial acetic acid per gallon of water. To this acidic solution is added with stirring colloidal alumina at the rate of 120 grams per gallon of solution and 108 grams of aluminum nitrate are added thereto. Alumina-silica fibers which have been intensely comminuted or chopped so that substantially all of the fiber segments are no longer than about 0.10 inch, many being less than half as long, are uniformly dispersed in the acidic solution of colloidal alumina at the rate of 125 grams per gallon. Such short fiber segments are necessary to ensure that vacuum-drawing the suspension thereof will cause the fiber segments to move down freely between the pins of the mold and form a compact fiber pad surrounding all the pins.

It is another surprising feature of the invention that, in spite of the unusually short fiber segments, the perforated ceramic plate vacuum-formed therewith has remarkable strength. In fact, by using a large mold, circular perforated ceramic fiber plates with a diameter of 16.5 inches, a thickness of 0.5 inch, and 69 perforations (0.078 inch diameter) per square inch of the plate, except for a peripheral rim 1.75 inches wide left unperforated, have been produced and have proved strong enough to perform as infrared gas burners under water heaters when each plate is supported solely along its narrow unperforated rim. Of course, the mold only formed compact fiber pads that were dried at a temperature of 450° F. and the resulting dried plates were then protected against water damage by immersion in a basic solution of colloidal silica and by drying the silica-impregnated plates at a temperature of 450° F.

Performance tests with thus produced, large circular (16.5-inch diameter), perforated ceramic fiber plates as infrared burners of water heaters were conducted by injecting low-pressure (4 inches water column) natural gas into a venturi to inspirate at least 110% stoichiometric combustion air. A firing rate of about 40,000 BTU per hour maintained the discharge face of the ceramic plate in a flameless radiant state and yielded a combustion product gas containing very small quantities of air pollutants (nitrogen oxides, carbon monoxide and unburned hydrocarbons). The use of such a large circular burner with a water heater is described in assignee's application Ser. No. 08/299,360, filed Sep. 1,1994, now U.S. Pat. No. 5,494,003.

Besides the performance tests which confirmed that the perforated ceramic fiber plates of the invention are strong enough to resist sagging and fracturing when functioning as infrared gas burners that have a 13-inch diameter span without any support, test specimens (herebelow named Alzeta) of the same ceramic fiber plates, taken from the perforated portion, were subjected to the three-point flexural test performed according to ASTM D 790-88 standard test method (Test Method I, Procedure A). Similar test specimens of Tennaglo® ceramic burner (U.S. Pat. No. 3,954,387) and of Schwank® ceramic burner (U.S. Pat. No. 2,775,294) were also subjected to ASTM D 790-86 standard test. The test could not be applied to the ceramic burners of U.S. Pat. Nos. 4,504,218 and 4,673,349, previously mentioned, because these burners are not being produced.

The test results are tabulated herebelow for easy comparison.

| Sample | (1) Load | (2) Deflection | (3) Stress | (4) Strain | (5) "Work" | (6) "Toughness" |
|---|---|---|---|---|---|---|
| Tennaglo | 5.00 | 0.020 | 155 | 0.003 | 0.07 | 0.519 |
| Schwank | 6.57 | 0.010 | 195 | 0.002 | 0.03 | 0.079 |
| Alzeta | 9.07 | 0.088 | 147 | 0.020 | 0.70 | 1.300 |

-continued

| Sample | (1) Load | (2) Deflection | (3) Stress | (4) Strain | (5) "Work" | (6) "Toughness" |
|---|---|---|---|---|---|---|

(1) maximum load in pounds force
(2) deflection at failure in inches
(3) maximum stress in pounds per square inch
(4) maximum strain in inches per inch
(5) area under curve plotted with (2) as abscissa and (1) as ordinate
(6) area under curve plotted with (4) as abscissa and (3) as ordinate It is significant that while the stress (3) values of the three burners are not materially different, the "toughness" (6) of the Alzeta burner far surpassed that of the other two burners: more than 16 times the Schwank burner and about 2.5 times the Tennaglo burner. It should be noted that the Tennaglo specimens had only 15% perforation area compared with 33% perforation area of the Alzeta specimens. Corrections were made in the stress, strain and "toughness" values for the slightly greater thickness of the Alzeta specimens.

It is believed that the "toughness" figure is the most critical parameter in many applications of the Alzeta perforated ceramic fiber plate. For example, a drop test requires the product to absorb a certain amount of energy to survive and "toughness" is a measure of the ability of the product to absorb energy and thus resist breakage. Likewise, strain (4) is critical in production in that it minimizes manufacturing control problems. The Alzeta product is also noteworthy for low thermal conductivity and low density which are certainly properties of value to the use of the product as a flameless infrared gas burner.

The performance tests in which the perforated ceramic fiber plate of this invention functioned as an infrared radiant gas burner with a 13-inch unsupported span below a water tank without sagging or fracturing demonstrated that the product is unique in providing the large, water heater industry with a long-desired, infrared burner of low cost and reliable service. In spite of the many proposals in patents and perforated ceramic plates offered by manufacturers, a product comparable to that of the invention with regard to large size (example, 16.5 inches diameter), closeness of perforations (not exceeding 0.13 inch from center to center), "work" and "toughness" (both terms previously defined) has heretofore been unknown. Another feature of the new product is that it has these unparalleled properties in spite of the elimination of the conventional, costly sintering at temperatures above 1000° F. In short, the unsintered product of the invention has the further benefit of reduced manufacturing cost.

The outstanding physical properties of the new product are all the more surprising when it is realized that it is essentially a compact layer or pad of finely chopped ceramic fibers with closely spaced, small perforations, and a binding agent uniformly distributed throughout the layer and resulting from an inorganic sol dried at a temperature not exceeding about 650° F. The sol may be that of colloidal alumina or colloidal silica.

The compact pad or layer of finely chopped ceramic fibers (maximum length about 0.10 inch) wet with a film of the sol of colloidal alumina or colloidal silica, when dried, becomes the novel product of this invention. Preferably, as in the specific example using colloidal alumina, the chopped ceramic fibers are at least 95% by weight of the product and the binding agent formed by the dried sol is only 5% by weight or less. Impregnating the product made with the dried sol of colloidal alumina with the sol of colloidal silica and redrying the product roughly doubles its weight.

The formulation of the suspension of chopped ceramic fibers given in the specific example of the invention may be varied. For example, the amount of acid is preferably controlled to yield a colloidal alumina solution with a pH in the range of about 2.5 to 3.5. The quantities of colloidal alumina and aluminum nitrate may also be varied but the viscosity of the acidic solution of colloidal alumina should not be materially different than that of the solution of the example. High concentrations of colloidal alumina above about 4% that lead to clumping are undesirable. The use of an additive that influences viscosity, such as a polyvalent salt, preferably aluminum nitrate, is helpful in attaining a good viscosity for the suspension of the chopped ceramic fiber. Preferably, such a viscosity is in the range about 400 to 600 centipoises, as measured in a Brookfield, LV Model, viscometer, with No.1 spindle rotating at 6 revolutions per minute. The chopped fiber content given in the example was chosen after a series of tests with increasing fiber quantities. Obviously, lower fiber contents may be used but undesirably reduce the formation of fiber pad per gallon of filtered suspension. Somewhat higher contents are possible with slightly increased colloidal alumina usage.

When colloidal silica is used instead of colloidal alumina as the binding agent for the chopped ceramic fibers, the acidic solution thereof preferably has a pH in the aforesaid range of about 2.5 to 3.5 and a viscosity in the aforesaid range of about 400 to 800 centipoises.

Variations of the mold of the invention will be apparent to those skilled in the art particularly inasmuch as it requires only two basic components: a perforated filter or casting base and a base holding a myriad of pins that project through the perforated base, the two bases being movable toward and away from each other. Also, instead of applying vacuum to tube 22 of FIG. 2, the suspension of chopped ceramic fibers can be pumped into tube 21 at a pressure, say 15 pounds per square inch, to effect the same rapid deposition of chopped fibers around pins 14 and drainage of liquid through mold 10 achieved by applying vacuum to tube 22. Thus, the invention involves the deposition of chopped ceramic fibers on the casting base of the mold by pressurized filtration of the aqueous suspension of chopped fibers conducted by supplying the suspension to the mold at elevated pressure or preferably by applying vacuum to the discharge side of the mold. Accordingly, only such limitations should be imposed on the invention as are set forth in the appended claims.

What is claimed is:

1. A process for forming a compact perforated pad of chopped ceramic fibers which upon subsequent drying becomes a perforated ceramic fiber plate, said process comprising the pressurized filtration of a suspension of said chopped fibers in an aqueous solution containing an inorganic binding agent selected from the group consisting of colloidal alumina and colloidal silica through a perforated filter base wherein the perforations have individual pins extending therethrough that are not more than 0.08 inch in diameter and are spaced from one another not more than 0.13 inch from center to center, said pins being held in a pin support base positioned adjacent the discharge side of said perforated filter base and said pins projecting beyond said perforated filter base at least slightly more than the desired thickness of said pad of said chopped fibers being formed thereon, terminating said pressurized filtration when said pad of said chopped fibers has said desired thickness, withdrawing said pins from contact with said pad of said chopped fibers by moving said perforated filter base and said pin support base away from each other, removing said pad of said chopped fibers from said perforated filter base, and drying said pad of said chopped fibers to yield said perforated ceramic fiber plate.

2. The process of claim 1 wherein the pressurized filtration is conducted by applying vacuum to the discharge side of the perforated filter base.

3. The process of claim 1 wherein the binding agent is colloidal alumina and aluminum nitrate is an additive.

4. The process of claim 1 wherein the minimum dimension of the perforated filter base is at least 12 inches.

5. The process of claim 1 wherein the perforated filter base is circular and has a diameter in the range of about 14 to 18 inches.

6. The process of claim 5 wherein the pressurized filtration is conducted by applying vacuum to the discharge side of the perforated filter base, said pressurized filtration is terminated when the pad of chopped fibers is about 0.5 inch thick, and the drying of said pad of said chopped fibers is effected at a temperature in the range of about 450° F. to 650° F.

7. The process of claim 6 wherein the binding agent is colloidal alumina and aluminum nitrate is an additive.

8. A mold for the formation of a compact perforated pad of chopped fibers by the pressurized filtration of a liquid suspension of said chopped fibers through said mold which comprises a perforated filter base, a pin support based positioned adjacent the discharge side of said perforated filter base, and a multiplicity of pins extending from said pin support base through the perforations of said perforated filter base and beyond at least slightly more than the thickness of said perforated pad to be formed on said perforated filter base, said pins being not more than 0.08 inch in diameter and spaced from one another not more than 0.13 inch from center to center, said pin support base and said perforated filter base being movable relative to one another so that said pins are fully withdrawn from contact with said perforated pad formed on said perforated filter base while said perforated pad is removed therefrom and then are returned to extend beyond said perforated filter base during the next formation of said perforated pad.

9. The mold of claim 8 wherein a source of vacuum is connected to the mold on the side opposite that on which the perforated pad of chopped fibers is formed.

10. The mold of claim 9 wherein the minimum dimension of the perforated filter base is at least 12 inches.

11. The mold of claim 8 wherein the diameter of the pins is about 0.01 inch less than the diameter of the perforations through which said pins extend.

12. The mold of claim 11 wherein a source of vacuum is connected to the mold on the side opposite that on which the perforated pad of chopped fibers is formed.

13. The mold of claim 12 wherein the perforated filter base is circular and has a diameter in the range of about 14 to 18 inches.

* * * * *